United States Patent

Marinus

[15] 3,688,557
[45] Sept. 5, 1972

[54] TESTING OF A CHAIN LINK-MECHANISM

[72] Inventor: Victor Alois Marinus, Standoncklaan 52, B2610 Wilrijk, Belgium

[73] Assignee: Gevaert-Agfa N.V. Mortsel, Belgium

[22] Filed: Oct. 26, 1970

[21] Appl. No.: 83,980

[30] Foreign Application Priority Data

Oct. 27, 1969 Great Britain..........52,574/69

[52] U.S. Cl..........................................73/9, 198/232
[51] Int. Cl..............................................G01n 19/02
[58] Field of Search............................73/9; 198/232

[56] References Cited

UNITED STATES PATENTS

| | | | |
|---|---|---|---|
| 3,149,715 | 9/1964 | Massimiani | 198/232 |
| 3,111,294 | 11/1963 | Werner | 73/9 X |
| 2,785,566 | 3/1957 | Mims | 73/9 |

Primary Examiner—Louis R. Prince
Assistant Examiner—Daniel M. Yasich
Attorney—William J. Daniel

[57] ABSTRACT

A method and a device for testing in an endless rotating chain link mechanism the bearing friction of the rollers of the chain which co-operate with stationary guide rails to guide the chain. A detector is provided adjacent the path of the rollers of the mechanism which makes frictional contact with the rollers, and which is arranged for limited movement in a direction parallel to the path of the rollers to be tested. The detector is biased in a direction which is opposite to the direction in which the rollers of the chain tend to displace the detector by the frictional contact therewith. The equilibrium position which is taken by the detector is a measure for the resistance to rotation of the rollers.

9 Claims, 5 Drawing Figures

TESTING OF A CHAIN LINK-MECHANISM

The present invention relates to the testing of rollers of an endless rotating chain link mechanism and in particular to a method and a device for detecting defective rollers of such mechanism. The term "defective" points in the present specification to rollers having an excessive resistance to rotation.

The invention has been particularly developed in connection with chain link mechanisms used in apparatus for stretching and heat-setting freshly extruded thermoplastic, orientable polymeric film.

As known, by stretching such extruded polymeric film both longitudinally and transversely while the polymer is at a temperature above the first order transition temperature, the polymer can be subjected to molecular orientation leading to an improvement of various physical properties of the film.

The transverse stretching of the film is usually done by means of a plurality of film clamps which engage the film at both edges and which follow diverging paths thereby to increase the width of the film by a factor which is frequently comprised between 2 and 4. The film clamps are fixed to two endless chain link mechanisms which are each located at one side of the film path and which co-operate with guide rails which determine the proper path of the film clamps.

The heat-setting of the film is done for reducing the thermal shrinkage of the stretched film. The film is gripped with both its edges in film clamps which follow parallel paths through a zone wherein the film is heated to a temperature above its stretching temperature and below the melting temperature of the polymer. The film clamps and the endless chain link mechanism which carry them may be similar to the mechanism for the transverse stretching of the film.

In view of the high forces which are involved during the stretching and the heat-setting of the film, the chain link mechanism is provided with a plurality of rollers which co-operate with the guide rails so that rolling friction occurs between the moving chain mechanism and the stationary rails.

The bearings of the rollers are subject to frequent maintenance procedures because they must operate under severe conditions of load and temperature. Since one chain link mechanism contains a great number of rollers, e.g. a number of 4,000 rollers is not at all uncommon, a lubrication routine is extremely time-consuming and therefore it is frequently deferred in practice. As a consequence thereof, and occasionally also because of false mounting, it occurs that one roller bearing runs hot and becomes jammed. The roller slides over the guide rails instead of rolling thereon, so that it abrades the guide surface of the rail. The fine iron particles produced by the abrading action penetrate into other bearings which become destroyed and which damage the guide rails in their turn, and the resulting cumulative effect may destroy the complete mechanism within a few hours. In addition, in the production of molecular oriented film base for the manufacture of radiographic film in the photographic industry, the presence of even the slightest metal particle on the film surface becomes visible as a black area having a diameter of several decimeters after exposure and development.

It has been proposed to use an IR-detector in analogy with the technique used by railway services, in order to detect bearings which are running hot. However, at the moment an over-heated bearing can be detected, slipping has mostly occurred already so that iron particles have been produced which have been distributed over the chain. The replacement of the defective bearing is insufficient and a thorough cleaning of the complete installation is imperative.

The present invention aims at providing a method and a device for detecting defects in the roller bearings at an early stage, so that serious damage to the installation may be prevented and the uninterrupted working period of the extrusion line may be extended considerably.

According to the present invention, the method for testing an endless rotating chain link mechanism having a plurality of rollers co-operating with stationary guides, e.g. guide rails, comprises putting the rollers of the mechanism at a determined locus on their path in frictional contact with detection means which is arranged for limited displacement in the direction of advance of the rollers and which is biased against such displacement, and using displacement of said detection means under the influence of the frictional contact with the rollers of the chain as a measure of the resistance to rotation of the roller.

In a preferred embodiment of the method, at least two rollers at a time are put into frictional contact with the mentioned detection means so that said means is kept in continuous displacement during the operation of the installation so that a higher response speed and a more continuous measurement signal will be obtained than if the detection means is permitted to return into the inoperative position between successive roller.

The device according to the invention for testing an endless rotating chain link mechanism to detect defective rollers of said mechanism, comprises a detection member which is mounted adjacent the path of the rollers of the mechanism to make frictional contact with the rollers, and which is arranged for restricted movement in a direction parallel to the path of the rollers to be tested, means for biasing said detection member in a direction opposite to the direction in which the rollers of the mechanism tend to displace said member by frictional contact therewith, and means which is responsive to the position of said detection member.

An embodiment of the invention, selected by way of example, is described hereinafter with reference to the accompanying drawings wherein.

Figure 1:
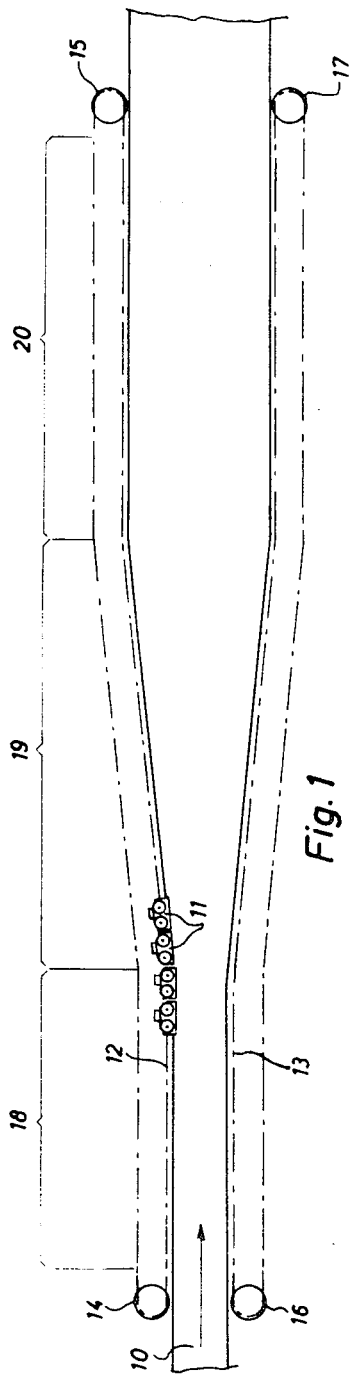
FIG. 1 is a top view of the film path in an arrangement for transversely stretching and for heat-setting a polymeric film.

Referring to FIG. 1, a freshly extruded film 10 of a linear organic orientable polymer e.g. polyethylene terephthalate, which has been quenched on a quenching drum and stretched longitudinally in order to improve its physical properties in that direction, is gripped at both its edges by a plurality of film clamps 11, only some of which are shown. The film clamps 11 are supported by endless chain link mechanisms 12 and 13, shown by dash and dot lines, which extend between sprocket wheels 14, 15 and 16, 17. Wheels 15 and 17 are driven to ensure the advance of the chain link mechanism.

The chain links are guided by stationary rails so that the film clamps follow parallel paths in the zone 18 where the film is preheated prior to the stretching, diverging paths in the zone 19 where the film is heated to the temperature required for the transverse stretching, and parallel paths in the zone 20 wherein the temperature is increased to heat-set the film. At the end of zone 20 the film clamps are opened so that the film is released and can pass to the successive stations for the heat-relaxing, edge-trimming, subbing, etc.

During the operations of transverse stretching and heat-setting, the film exerts great forces on the film clamps. In view thereof, the chain link mechanism supporting the film clamps is provided with a plurality of rollers which co-operate with stationary guides so that a minimum of friction is obtained.

Figure 4:
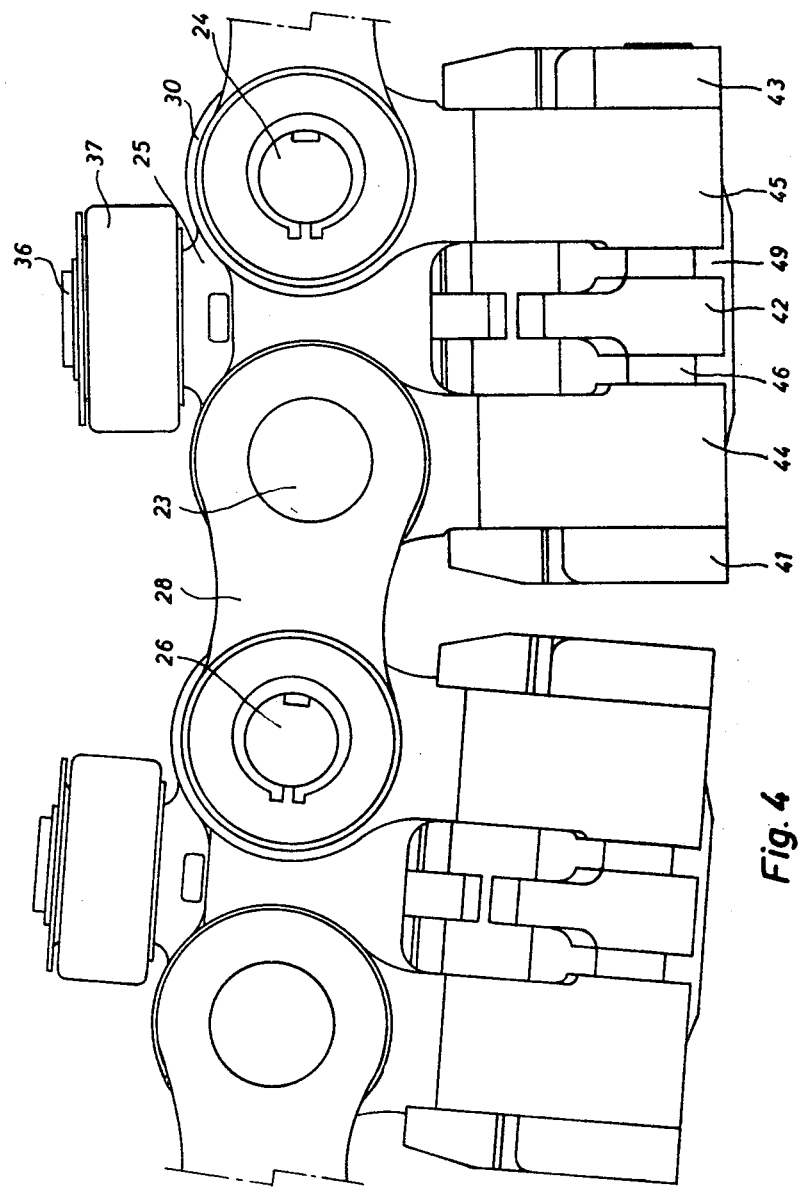
FIG. 4 is a top view of two film clamps.
Figure 5:
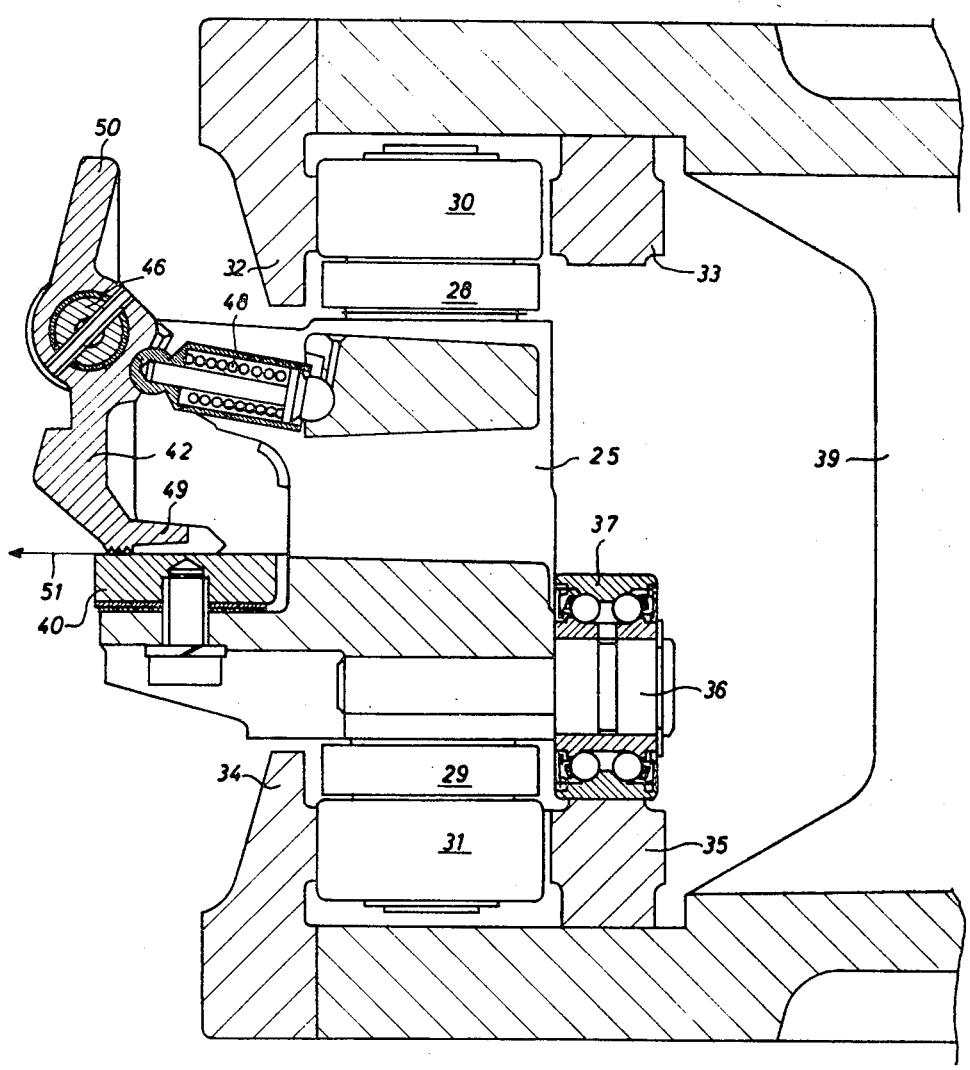
FIG. 5 is a transverse cross-sectional view of a film clamp.

The chain links and the film clamps, which actually form one part, are shown in detail in FIGS. 4 and 5. In FIG. 4 a top view of two chain sections is given wherein the guide rails are omitted and the upper roller at the left side of each section has been removed. In FIG. 5 a transverse cross-sectional view of one section is given which shows the co-operation of the chain mechanism with the guide rails.

Each chain element comprises a body portion 25 with two parallel bores wherein pins 23 and 24 rotatably fit. The body portion 25 is linked to the next element through link plates 28 and 29 which closely fit over the pin 23 of the first section and over the pin 26 of said next section. Rollers 30 and 31 are fitted to the extremities of each pin and they co-operate with guide rails 32, 33 and 34, 35 which have parallel guide surfaces which determine the path of the film clamps in the horizontal plane. The body portion of each element is also provided with a roller 37 which is rotatably supported by a stud 36 and which co-operates with a guide face on top of the guide rail 35 so as to guide the chain mechanism in the vertical plane.

The guide rails are bolted to a framework 39 and they terminate close to the sprocket wheels 14 to 17. Each sprocket wheel has two rows of teeth which engage the chains between the rollers 30 and 31 and which fit against the outer sides of the link plates so as to vertically support the chains as they are returned over 180°.

Each film clamp comprises a lower fixed jaw 40 which is mounted on a horizontal protruding part of the body portion, and an upper movable jaw 49 which is supported by three arms 41, 42 and 43, which are fitted to a horizontal pin 46. The said pin is pivotally journalled in extended portions 44 and 45 of the body member. The jaw is opened through an arm 50 which forms an elongated part of the central arm 42 and which is pivoted through engagement with an additional guide, not shown, which pushes said arm 50 to the left, thereby lifting the jaw 49 in the direction indicated by the arrow.

A compression spring mechanism 48 keeps the pivotal jaw 49 in the open position during the returning movement of the chain from the sprocket wheels 15, 17 to the sprocket wheels 14, 16.

The rollers used in the mechanism described are actually double row radial ball bearings, the inner ring of which is fitted to the chain link mechanism and the outer ring of which makes contact with the guide surfaces of the rails.

In the operation of the mechanism, the travelling film which is gripped with its edge between the jaws 40 and 49 exerts a pulling force in the direction indicated by the arrow 51. The reaction forces arise at the contact areas between the rollers 30, 31 and the guide surfaces of the corresponding guide rails 32 and 34, and they cause said rollers to roll on the guide rails. The roller 37 rolls on the guide surface of rail 35, since it is biased towards said rail by the force of gravity which acts on the chain mass. During the return movement of the chain mechanism, the force acting in the direction of the arrow 51 has become zero so that, owing to the greater mass of the chain sections at the side of the jaws, the rollers 31 will now tend to ride on the guide rail 35.

The rollers continue rolling on their respective guide surfaces as long as the running torque of the bearings is lower than the driving torque which is supplied by the frictional contact with the guide surfaces.

In case, however, the bearing friction increases, e.g. as a consequence of lubricant failure or of the presence of foreign matter onto the ball-groove contact area, the driving of the roller may become insufficient to keep the roller rotating. The outer bearing ring starts to slip over the surface of the guide rail and performs an abrasive action on the guide surface. The tiny metal particles which are produced as a consequence thereof are distributed over the rail and they will penetrate into other roller bearings which may become jammed in their turn.

Figure 2:
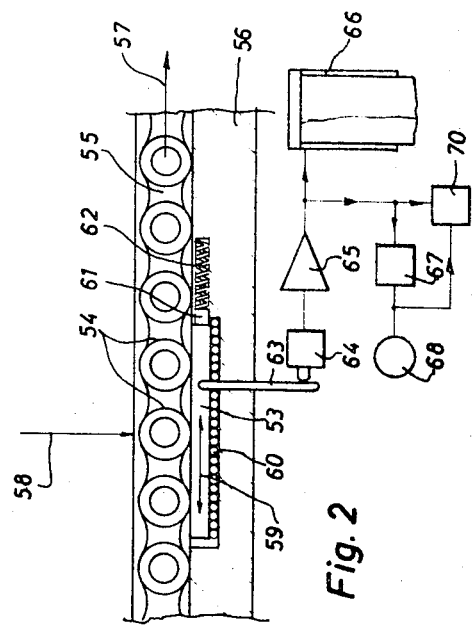
FIG. 2 is a diagrammatic view of the testing device according to the present invention.
Figure 3:
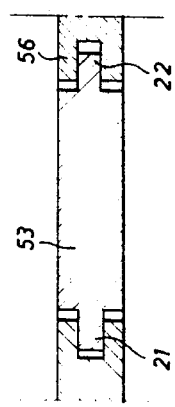
FIG. 3 is a diagrammatic sectional view of the engagement of the detection member with the guide rail.

The device according to the present invention for testing the chain mechanism and for detecting defective rollers thereof is shown in FIGS. 2 and 3. It comprises a detection member 53 in the form of a short rail element which provides a guide surface for the rollers 54 of the chain mechanism 55 at the area where an interruption in the guide surface of the guide rail 56 exists. The chain mechanism is moving in the direction of the arrow 57 and it is biased in the direction indicated by the arrow 58, so that the rollers are forced to roll on the guide surface as the chain advances. The detection member 53 is mounted for displacement in respect of the rail 56 in a direction parallel to the path of the rollers, as indicated by the arrow 59, and it has a clearance of a few millimeters which permits such longitudinal displacement. The journalling of the detection member 53 is done by a roller bearing, represented by the rollers 60, which provides a very low friction between the said member 53 and the rail 56. The longitudinal extremities of the detection member 53 are provided with tooth-like extensions 21 and 22 which reach into corresponding grooves in the rail 56 (see the diagrammatic horizontal section in FIG. 3). The upper surface of the detection member 53 lies flush with the guide surface of the rail 56. The rollers rolling over the detection member have a width exceeding the width of the extensions 21 and 22 so that a smooth cross-over of the rollers towards and from the detection member is obtained. In addition, one extremity of detection member 53 is provided with a plunger 61 which engages a compression spring 62 which is provided in a bore in the guiderail 56 and which biases the detection member in a direction which is opposite to the direction wherein the moving chain tends to displace the said member. The deformation of the spring 62 is linear with the force applied thereto, and the spring biasing is such that the force which is applied to the member 53 by three normally functioning rollers 54 suffices for displacing the member out of its inoperative position, located at the left side according to the drawing, but does not suffice for letting the member abut against the rail 56 at the side where compression spring is provided.

The member 53 has a finger 63 which actuates the sensor of a transducer 64 which produces an electric measurement signal proportionally to the position taken by the detection member 53. The electric signal is amplified by amplifier 65 and recorded on a recorder 66. The output signal of the amplifier 65 may also be fed to a limit checker 67 which compares the input signal with a pre-set limit signal and which may actuate an acoustical warning device 68 when the limit value is exceeded.

The operation of the installation is as follows.

During the warming-up of the extrusion installation, the bearing friction of the chain rollers diminishes until the normal operating value is obtained. The warming-up is followed by the detection member 53, the average position of which slightly changes towards the left side as the bearing friction decreases.

During the normal operation of the installation, the average position of the detection member 53 remains practically unchanged. The actual position, however, undergoes a small change at the moment one roller leaves the member and another roller makes contact therewith, and the direction of this change depends on whether the member contacts four or only two rollers during the change-over of each successive chain element.

After prolonged use of the installation, it may be seen that the average position of the detection member 53 shifts to the right, pointing to a generally increased bearing friction of the rollers.

In case for some reason one roller bearing becomes defective in the sense that its bearing friction has increased with respect to that of the other rollers, said defective roller will cause the member 53 to take a new equilibrium position which is located more to the right, and the recorder 66 will plot on the registration paper the correspondingly increased friction. As the defective roller leaves the member 53, the latter resumes its initial position corresponding to rollers with normal bearing friction. The defective roller is detected at each chain revolution and the operator who periodically examines the registration paper will rapidly see what is going wrong and to what extent the friction of the defective bearing is increasing. As mentioned already hereinbefore, the detection of the defective roller may also occur automatically by means of a limit checker 67 and a warning device 68.

When a defective roller has been detected, it is to be preferred that an indication be given which facilitates the locating of the said roller.

In one way, the rollers of the chain may be numbered or at least the endless chain be given an arbitrary zero so that the counting of the rollers may start up from such point. A counter may count down from the number of rollers which are present in the row of rollers of the chain which is being tested, and may be arrested at the moment a defective roller is found. The counter has been diagrammatically represented by the part 70 in FIG. 2 and is driven by the transition pulse in the output signal of the amplifier 65, which points to the passage of one roller. The arrestment of the counter is controlled by the electric signal which is derived from the limit checker 67. Means may be provided, known in itself, for controlling the proper synchronism between the chain and the counter, and for resetting the counter after each revolution of the chain. The counter requires not at all an absolute accuracy and if the location of a defective bearing is indicated with an approach of a few rollers, this is quite sufficient in practice for enabling the operator to quickly locate the defective roller after the arrestment and the cooling of the chain installation.

In another way, marker means may be provided including a marker dye supply conduit which feeds a nozzle unit located close to the chain path. The nozzle unit is controllable by a solenoid valve in response to a control signal from the limit checker 67. Thus, if a defective roller bearing is detected in the chain, the marker nozzle solenoid is momentarily actuated to apply a spot of colored marking composition onto the defective roller or onto an area of the chain in the vicinity thereof.

According to a further embodiment, integrating means may be provided which integrates the measurement signal over one chain revolution so that a measurement indication may be obtained which is representative for the general condition of the roller bearings.

It will be understood that the chain installation shown in FIGS. 1, 3 and 4 will actually comprise six detection devices as described in connection with FIG. 2, because each of both chain mechanisms comprises three rows of rollers. The outputs of the six detection devices may be connected to a commutator which connects one single measuring circuit, including an amplifier 65, a recorder 66, a limit checker 67 and a warning device 68, successively to the output of the transducers 64 of the six detection devices. In this way, the bearing friction of the six rows of rollers of the installation is plotted on one recording chart. The commutation may occur automatically after each complete chain revolution, or after several chain revolutions.

The mentioned six detection devices are mounted at a locus of the chain path where a sufficient force biases the rollers towards the guide surfaces of the rails. For the rollers 30 and 31 this will preferably be a locus at that part of the chain path where the film clamps engage the edges of the film, and for the rollers 37 this may be any part of the chain path between the sprocket wheels.

The invention is not limited to the described embodiments.

The number of rollers which is in contact with the detection member 53 at a time may be greater than three, and it will be understood that as this number is greater the influence of each roller, which contacts and leaves the detection member 53, will be smaller onto the momentary position of said member so that the distinctive power of the device is increased. Further the detection system may also operate pneumatically, or pneumatically-electrically. The bearing of the detection member 53 is improved if this member is supported by a pressurized air or oil film bearing. In this way the friction of said member in respect of the rail 56 is virtually zero, so that its position is a direct measure for the bearing resistance of the rollers being measured.

In the operation of the device, the occurrence has been noted that a certain roller is defective during one chain revolution, and is no longer defective during the next chain revolution. It is supposed that this is due to an iron dust particle or the like which has briefly entered the roller bearing. In order to avoid that such temporarily defective roller should lead to the arrest of the apparatus, it may be interesting to store defect signals in two or more memory circuits, each circuit storing the defect signals of one chain revolution.

The memory circuits may control a gate circuit so that — if after two or more chain revolutions a defect is recorded at the same locus of the chain — the defect signal is passed to a recorder, a warning installation, a marking device, etc.

Spring member 62 need not necessarily have a linear characteristic, but it may, for instance, also be a spring with a logarithmic characteristic whereby a wider measuring range is obtained. Furthermore, the function of member 62 may also be performed by an appropriate tension spring, a leaf spring, a pneumatic device or, more generally, any device which is capable of producing a resistance which increases with the displacement of a displaceable member.

The application of the method and the device according to the invention is not limited to the chain link mechanism which has been described, but it may extend to other types of chain mechanisms as well. We refer in this respect to a chain link mechanism used for the biaxial stretching of orientable organic polymer film, wherein each film clamp is linked to the next film clamp through a deformable parallelogram mechanism which permits the film clamps of a chain to be relatively removed from each other towards the end of the transverse stretching zone so as to stretch the film also longitudinally during the transverse stretching.

In addition, the application of the invention is not limited to the testing of rollers of chain mechanisms used in the treatment of polymeric films, but it extends also to the testing of other endless chain mechanisms, e.g. chains used for supporting metal parts such as car bodies, and transporting them in a continuous movement through a cleaning station, an etching station, a painting station, a drying station, etc.

We claim:

1. In a chain drive mechanism wherein a plurality of rollers are each journaled for rotation about a pin and the pins are connected into an endless chain by links, said chain moving around two sprocket wheels in an endless path having a driving stretch and a return stretch, and an elongated stationary rail is arranged adjacent at least a portion of one stretch of said chain path for rolling contact with the rollers passing therealong to determine the path of said rollers through said portion of the path, a mechanism for detecting the development of excessive friction in said roller journals comprising a section of said elongated rail separate from the remainder of the rail and supported for limited free independent movement, parallel to the adjacent stretch of the chain path, spring means biasing said separate rail section in a direction opposite to the direction of movement of the portion of the chain adjacent thereto, and means for sensing any movement of said separate rail section in the direction of chain movement and providing an indication thereof.

2. Device according to claim 1, wherein said separate rail section engages the remainder of the rail at both of its ends through a mating tongue and groove arrangement to thereby provide for the rollers a substantially uninterrupted rail surface.

3. Device according to claim 1, wherein the separate rail section is supported for independent movement relative to the stationary rail by means of a low friction bearing.

4. Device according to claim 3, wherein said bearing is an air bearing.

5. Device according to claim 1, wherein the length of said separate rail section covers at least four successive rollers.

6. Device according to claim 1, wherein said sensing means comprises a transducer which provides a signal which is proportional to the displacement of such member, and a recorder for recording said signal.

7. Device according to claim 6 wherein said sensing means includes means which determines the average value of the position of the separate rail section in order to provide an indication of the general condition of the bearing friction of the rollers.

8. Device according to claim 6, wherein said sensing means includes limit checking means which operates a warning signal if the position of the separate rail section exceeds a predetermined limit.

9. The mechanism according to claim 8, including position indicating means which is controlled by the limit checking means, and which indicates the position of a defective roller.

* * * * *